Figure 1:
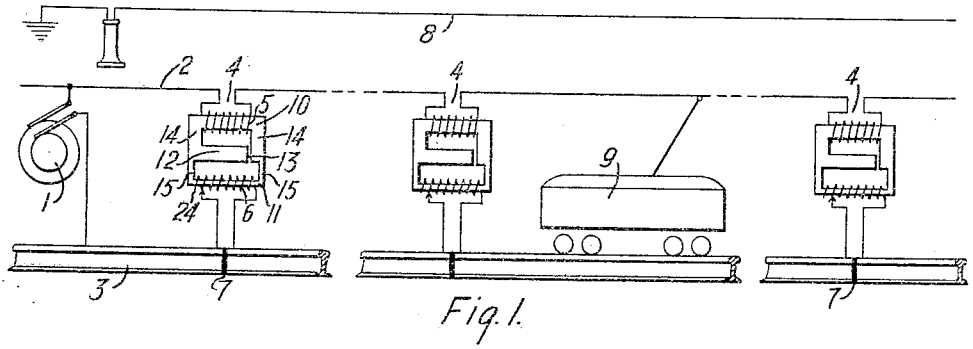

A. CHERNYSHOFF.
DISTRIBUTING SYSTEM.
APPLICATION FILED APR. 1, 1915.

1,292,578.

Patented Jan. 28, 1919.

WITNESSES:
Fred A. Lind.
Geo. W. Hansen.

INVENTOR
Alexander Chernyshoff
BY
Wesley G. Carr
ATTORNEY

UNITED STATES PATENT OFFICE.

ALEXANDER CHERNYSHOFF, OF SWISSVALE, PENNSYLVANIA, ASSIGNOR TO WESTINGHOUSE ELECTRIC AND MANUFACTURING COMPANY, A CORPORATION OF PENNSYLVANIA.

DISTRIBUTING SYSTEM.

1,292,578. Specification of Letters Patent. Patented Jan. 28, 1919.

Application filed April 1, 1915. Serial No. 18,514.

*To all whom it may concern:*

Be it known that I, ALEXANDER CHERNYSHOFF, a subject of the Czar of Russia, and a resident of Swissvale, in the county of Allegheny and State of Pennsylvania, have invented a new and useful Improvement in Distributing Systems, of which the following is a specification.

My invention relates to means for minimizing inductive disturbances in electrical circuits which may be caused by other circuits located in proximity thereto.

More particularly, my invention relates to means for limiting the short-circuit currents on electrical railway systems to such values as will impose no serious inductive disturbances on intelligence-transmission circuits that may be located in the disturbing zones resulting from the flow of these high-power currents in the railway circuits.

When telephone, telegraph and like circuits are in proximity to other circuits carrying alternating currents for lighting or power purposes, such as alternating current railway systems, the electromotive forces induced in the intelligence-transmission circuits disturb and frequently preclude their successful operation. Consider, for example, an alternating-current railway system in which a trolley wire constitutes one of the supply conductors, and the track rails, in conjunction with the ground, constitute the other supply conductor. When a moving vehicle receives power from the system, a primary circuit comprising a single convolution of varying length and constituting the trolley conductor and the track rails, is formed and the currents flowing therein induce alternating electromotive forces in the telephone or telegraph circuits that are located partially or wholly in proximity to the railway system.

The electromotive forces induced in an intelligence-transmission circuit depend upon the distance it is removed from the railway circuit, the amounts and rates of variation of the currents flowing in the railway system, and the length of the intelligence-transmission circuit which is in the zones of the disturbing influences.

However, inductive disturbances thus imposed upon an adjacent transmission-intelligence circuit may be greatly minimized or substantially neutralized if the return flow of the trolley currents is confined to the track circuit comprising the rails of the railway system. This method of minimizing inductive disturbances imposed upon intelligence-transmission circuits is fully disclosed in United States Patent 1,196,300. In the above-mentioned patent the trolley conductor and the track circuit are inductively interlinked by means of a plurality of series transformers which are disposed at spaced intervals in the circuit, the primary windings of the transformers being connected in series-circuit relationship with the trolley conductor, and the secondary windings being connected at corresponding points in the track circuit and across insulating joints disposed in the rails. In this manner, the return flow of the trolley currents are confined to the track rails or to regions of the earth which are closely adjacent to the track rails. Consequently, the zones of disturbing inductive influences arising from the power currents are confined to limited regions, because the magnetic induction arising from the current flow in the trolley conductor is substantially minimized or neutralized by the magnetic induction arising from the current flow in the track circuit.

By means of my present invention, the inductive disturbances are further decreased because the values of the currents that may traverse the trolley conductor are limited in amount. In other words, the short-circuit currents to which a railway system is subjected, are substantially limited in value, thereby limiting the disturbances that may be imposed upon an adjacent transmission-intelligence circuit. At the same time, the electromotive forces induced in the secondary windings of the above-mentioned track transformers are limited to safe values, thereby eliminating the possibility of the insulating joints in the track being subjected to dangerous potentials when short-circuit currents flow in the railway system.

One object of my invention is to provide a transformer of the above-mentioned character for limiting to safe values the short-circuit currents occurring on a railway system. At the same time, the inductive disturbances arising therefrom and imposed on an intelligence-transmission circuit located in the disturbing inductive zone will be substantially limited, thereby permitting satisfactory operation of the adjacent telephone or telegraph circuit irrespective of the current flow in the railway system.

Another object of my invention is to limit to safe values the electromotive forces that may be impressed by the secondary windings of the transformers upon the insulating joints disposed at spaced intervals in the track circuit of the railway system.

Figure 2:
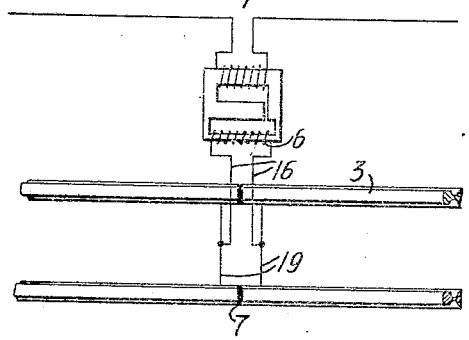
Figure 3:
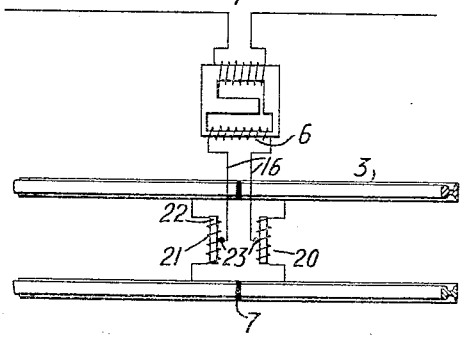
Figure 4:
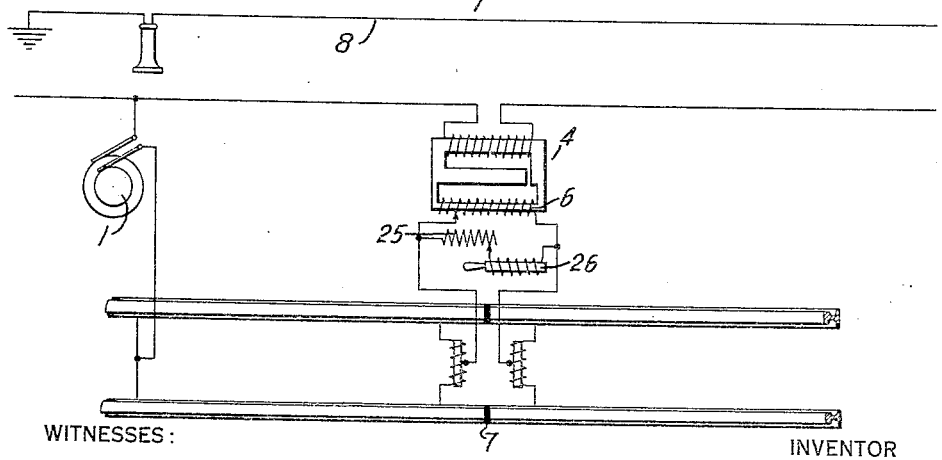

Other advantages arising from the use of my invention in connection with railway systems will be apparent from the following description and the accompanying drawing in which Figure 1 is a diagrammatic view showing an embodiment of my invention; Figs. 2 and 3 are diagrammatic views showing the methods employed in connecting the secondary windings of my transformers to the track circuit of a railway system, and Fig. 4 is a modified form of the system shown in Figs. 1 and 3, respectively.

Referring to Fig. 1, a source of current supply 1, shown as a single-phase alternator, is connected, through one of its terminals, to a trolley conductor 2 and, through another of its terminals, to a rail 3 of a track. A plurality of series transformers 4 are inserted at intervals along the railway system, as shown, primary windings 5 being connected in series-circuit relationship with the trolley conductor 2, and secondary windings 6 being connected to the rail 3 across insulating joints 7. The insulating joints 7 divide the track into a series of insulated conducting sections. An intelligence-transmission conductor 8, shown as a telephone conductor, is disposed adjacent to the trolley conductor 2 and the track 3, and is, therefore, subjected to the inductive influences arising from the currents flowing over the conductors comprising the railway system.

When a moving vehicle 9 receives power from the trolley conductor 2, the return trolley currents are confined to the rail circuit composed of the rails 3 by reason of the electromotive forces impressed across the insulating joints 7 by the secondary windings 6 of the series transformer 4. By impressing electromotive forces at intervals in the track circuit, the impedance of the track is substantially lessened.

As mentioned above, it is desirable to limit the value of the short-circuit currents in order to limit the disturbances imposed upon the intelligence-transmission circuit 8. Again, it is essential that the insulating joints 7 be kept intact at all times in order that the signaling systems employed upon the railway system may operate satisfactorily. Inasmuch as the insulating joints 7 may be subjected to comparatively small voltages only, because of their limited size, the material from which they are made and for other considerations, it is necessary to limit the voltages induced in the secondary winding 6 to safe values. To these ends, the transformers 4 are particularly adapted. Since all the transformers 4 are substantially similar in design, I will confine my description to one of them.

The primary winding 5 of the transformer 4 embraces a core leg 10 having a substantially large cross-sectional area. The secondary winding 6 embraces a second core leg 11 which is of a relatively smaller cross sectional area. Intermediate the core legs 10 and 11 is a third core leg 12 which is provided with an air gap 13. The magnetic circuit comprising the core leg 10, the air gap 13, the core leg 12, and the intervening yoke portions 14 has a substantially uniform cross-sectional area throughout its length. The portion of the magnetic circuit which comprises the core leg 11 and yoke portions 15, has a cross sectional area relatively smaller than that of the first-mentioned magnetic circuit. The core leg 11 and the yoke portions 15 are so proportioned, preferably by limiting their cross-sectional areas, that they become fully magnetically saturated when the current flowing in the primary winding 5 exceeds a predetermined value. Inasmuch as the value of the flux that flows through the core leg 11 is thus limited, the electromotive force induced in the secondary winding 6 may be controlled and limited to such value as will not affect the insulating qualities of the joints 7.

When a short circuit occurs upon the railway system, the current flowing over the trolley conductor 2 and through the primary windings 5 of the track transformers 4, will tend to rise to exceedingly high values. As a result, the inductive disturbances imposed upon the transmission line 8 may be substantially increased. If the short-circuit current exceeds a predetermined value, the magnetic flux in the core leg 10, arising from the excess current flow in the primary winding 5, will be precluded from flowing through the core leg 11 which is embraced by the secondary windings 6. On these occasions, the flux is forced across the air gap 13 and through the transformer core leg 12 by reason of the high magnetomotive forces generated in the primary winding 5. The primary winding 5 may now be considered as being interlinked with a closed magnetic circuit comprising the core legs 10 and 12, the air gap 13 and the yoke portions 14, the air gaps 13 imparting substantially straight-line characteristics to these closed magnetic circuits. As a consequence, the impedance of the primary winding 5 is substantially increased, inasmuch as the winding and its closed magnetic circuit of relatively low reluctance now act as a current-limiting coil, and the currents flowing in the trolley conductor 2 are substantially lessened because of the high impedance, and particularly the inductive reactance thereby afforded. At the same time, the electromotive forces impressed across the insulating joint 7 inserted in the rail are maintained at safe values, irrespective of the current flow over the trolley conductors 2, when said current flow exceeds a predetermined value.

In Figs. 2 and 3, I have illustrated methods by which it may be convenient to connect the secondary windings 6 of the transformers 4 to the rails 3 comprising the track circuit of the railway system. In Fig. 2, terminals 16 of the secondary winding 6 are connected to metallic bonds 19 which electrically connect the two rails together on each side of the insulating joint 7. In Fig. 3, the inductive bonds 20 replace the conducting bonds of Fig. 2, said inductive bonds comprising coils 21 that embrace magnetizable core members 22, the terminals 16 being connected to mid-points 23 on the coil windings 21. These inductive and conducting bonds are well known in the art and are illustrated only to show convenient methods of inductively interlinking the track circuit of a railway system with the trolley conductor. Of course, it will be understood that, in actual installations, the spacing and dispositioning of the transformers 4 and the insulating joints 7 are dependent upon many conditions, such as the signaling systems employed, the length of the railway circuit, the character of the intelligence-transmission circuit, etc.

It is desirable to provide adjusting means to compensate for the irregular spacing of the intelligence-transmission conductor 8 of Figs. 1 and 4 relative to the railway system. For this reason, it may be necessary to provide the primary and secondary windings of the transformers 4 with unequal numbers of turns so as to force a certain amount of the return trolley currents to flow through the earth in the nature of a secondary load, in addition to the magnetizing currents of the transformers. As a result, I have shown the secondary windings 6 as being provided with a plurality of adjustable taps 24.

While a proper adjustment of the relative turns in the primary and secondary windings of the track transformers 4 may greatly reduce the disturbing influences impressed upon the circuit 8, it may frequently be desirable to adjust the phase relationship of the ground currents, in order that the trolley and ground currents may be substantially 180° out of phase, as combined, in order to enhance the neutralization. To this end, the secondary windings 6 of Fig. 4 are shown adjustable and also as provided with phase-adjusting devices 25 and 26. By this means, the impedance drop in a given section of a trolley conductor and the impedance drop in the corresponding section of ground return may be caused to be brought into 180° phase relationship and a maximum neutralizing effect secured. The system employed in Fig. 4 to regulate the phase relationship of the ground currents is fully shown and described in the above-mentioned patent of Charles F. Scott.

While I have shown and described, in detail, an embodiment of my invention, it will be understood by those skilled in the art that many modifications may be made without departing from the spirit and scope of the appended claims.

I claim as my invention:

1. In an electrical distributing system, the combination of electrical conductors, with transformers inductively interlinking them to each other, the primary windings of the transformers being connected in series with one of said conductors, and the secondary windings being connected in series with another of said conductors, said transformers comprising means whereby the electromotive forces induced in the secondary windings of the transformers are substantially limited to certain values irrespective of the value of the excess currents above normal flowing through the primary windings of the transformers.

2. A railway system comprising a source of current supply, a trolley conductor, a track conductor, spaced transformers inductively interlinking the trolley and track conductors, the primary windings of the transformers being inserted in series circuit with the trolley conductor and the secondary windings being inserted in series circuit with the track conductor, said transformers comprising means to limit the electromotive forces induced in said secondary windings when the current flow through said primary windings exceeds predetermined values, said means simultaneously coacting to substantially increase the impedance of said primary windings.

3. A railway system comprising a source of current supply, a trolley conductor, a track, a plurality of spaced insulating joints inserted in the track, spaced transformers inductively interlinking the trolley conductor and the track, the primary windings of the transformers being inserted in series circuit with the trolley conductor and the secondary windings being connected to the track across said insulating joints, said transformers comprising means to limit the electromotive forces impressed across said insulating joints when the current flow through said primary windings of the transformers exceeds predetermined values, said means increasing the impedance of said primary windings.

4. A railway system comprising a source of current supply, a trolley conductor, a track conductor, spaced transformers having three core legs only two of which are embraced by current carrying windings to inductively interlink said trolley and track conductors, the primary windings of the transformers being inserted in series circuit with the trolley conductor and the secondary windings being inserted in series circuit with the track conductor, the core legs of the transformers embraced by the secondary windings being so proportioned that they become magnetically saturated when the current flow through the primary windings exceeds predetermined values.

5. A railway system comprising a source of current supply, a trolley conductor, a track conductor, spaced transformers having three core legs only two of which are embraced by current-carrying windings to inductively interlink said trolley and track conductors, the primary windings of said transformers being inserted in series circuit with the trolley conductor and the secondary windings being inserted in series circuit with the track conductor, the core legs of the transformers embraced by the secondary windings being so proportioned that they become magnetically saturated when the current flow through the primary windings exceeds predetermined values, and said third core leg which is provided with an air gap, constituting means whereby the impedance of the primary windings is substantially increased simultaneously with the saturation of said secondary winding core legs.

6. In an electrical distributing system, the combination of electrical conductors, with a transformer having a primary winding connected in circuit with one of said conductors and a secondary winding connected in circuit with another of said conductors, said transformer comprising means whereby the electromotive forces induced in the secondary winding are substantially limited to certain values irrespective of the value of the excess currents above normal traversing the primary winding, and means simultaneously actuated therewith to substantially increase the impedance of said primary winding.

7. In an electrical distributing system, the combination of electrical conductors, with a transformer having a primary winding connected in circuit with one conductor and a secondary winding connected in circuit with another conductor, said transformer having three legs two only of which are severally embraced by said windings and the third of which is provided with an air gap, one of said core legs embraced by one of said windings being so proportioned that its reluctance becomes abnormally high when the current flow through the other said winding exceeds a predetermined value.

8. In an electrical distributing system, the combination with electrical conductors, of a transformer having its windings severally connected in circuit with said conductors, said transformer comprising a core member having three legs, two only of which are embraced by said windings and the third of which is provided with an air gap, the ratio of the reluctance of the leg provided with an air-gap to the reluctance of one of the legs embraced by a current-carrying winding decreasing when the current flowing through said winding exceeds a predetermined value.

In testimony whereof, I have hereunto subscribed my name this 27th day of March, 1915.

ALEXANDER CHERNYSHOFF.

Copies of this patent may be obtained for five cents each, by addressing the "Commissioner of Patents, Washington, D. C."